US012705885B2

(12) United States Patent
Scarbrough

(10) Patent No.: US 12,705,885 B2
(45) Date of Patent: Aug. 11, 2026

(54) AUGMENTED REALITY DEVICES FOR SAFETY ALERTING

(71) Applicant: Micron Technology, Inc., Boise, ID (US)

(72) Inventor: Alyssa N. Scarbrough, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 106 days.

(21) Appl. No.: 18/745,351

(22) Filed: Jun. 17, 2024

(65) Prior Publication Data

US 2024/0420465 A1 Dec. 19, 2024

Related U.S. Application Data

(60) Provisional application No. 63/521,803, filed on Jun. 19, 2023.

(51) Int. Cl.

| | |
|---|---|
| ***G06V 20/20*** | (2022.01) |
| ***G06F 40/35*** | (2020.01) |
| ***G06V 20/40*** | (2022.01) |
| ***G06V 40/16*** | (2022.01) |
| ***G08B 21/02*** | (2006.01) |
| ***G08B 25/00*** | (2006.01) |

(52) U.S. Cl.
CPC .............. *G06V 20/20* (2022.01); *G06V 20/41* (2022.01); *G06V 40/172* (2022.01); *G08B 21/02* (2013.01); *G08B 25/00* (2013.01); *G06F 40/35* (2020.01)

(58) Field of Classification Search
CPC ................................ G06F 40/35; G06V 20/20
See application file for complete search history.

(56) References Cited

U.S. PATENT DOCUMENTS 11,792,455 B1 * 10/2023 Fu .......................... G06V 10/82 315/297
2015/0223731 A1 * 8/2015 Sahin ....................... A61B 5/16 600/595

* cited by examiner

*Primary Examiner* — Matthew Salvucci
(74) *Attorney, Agent, or Firm* — Schwegman Lundberg & Woessner, P.A.

(57) ABSTRACT

Disclosed in some examples are methods, systems, and machine-readable mediums which utilize augmented reality devices to detect and warn vulnerable individuals about real-life situations that could pose a hazard to their safety. One or more signals identified from data captured by sensors of one or more devices of the user may be analyzed to determine whether elements such as persons, objects, or the like pose a danger to the user. The system, upon detection of an unsafe event, situation, or person may then warn the user through the augmented reality glasses of the unsafe events, situations, or persons. In addition, a caregiver or other individual and/or the police may also be notified.

20 Claims, 5 Drawing Sheets

AUDIO/VIDEO COMMUNICATION, LOCATION INFORMATION

215

ANALYSIS COMPONENT

217 AUDIO ANALYSIS

219 ALERT COMPONENT

221 EXTERNAL SYSTEM API

223 VIDEO ANALYSIS

225 FACIAL RECOGNITION

227 SIGNAL INTEGRATION

EMERGENCY CONTACT

240

AUTHORITY DISPATCH (E.G. POLICE)

PERSON INFORMATION

IDENTITY SERVER AND DATA STORE

235

LIVE AUDIO LIVE VIDEO LOCATION INFO

ALERTS

ALERTS, LOCATION INFORMATION

MONITORED WEARABLE

210

230

MONITORING DEVICE

AUDIO/VIDEO COMMUNICATION, LOCATION INFORMATION

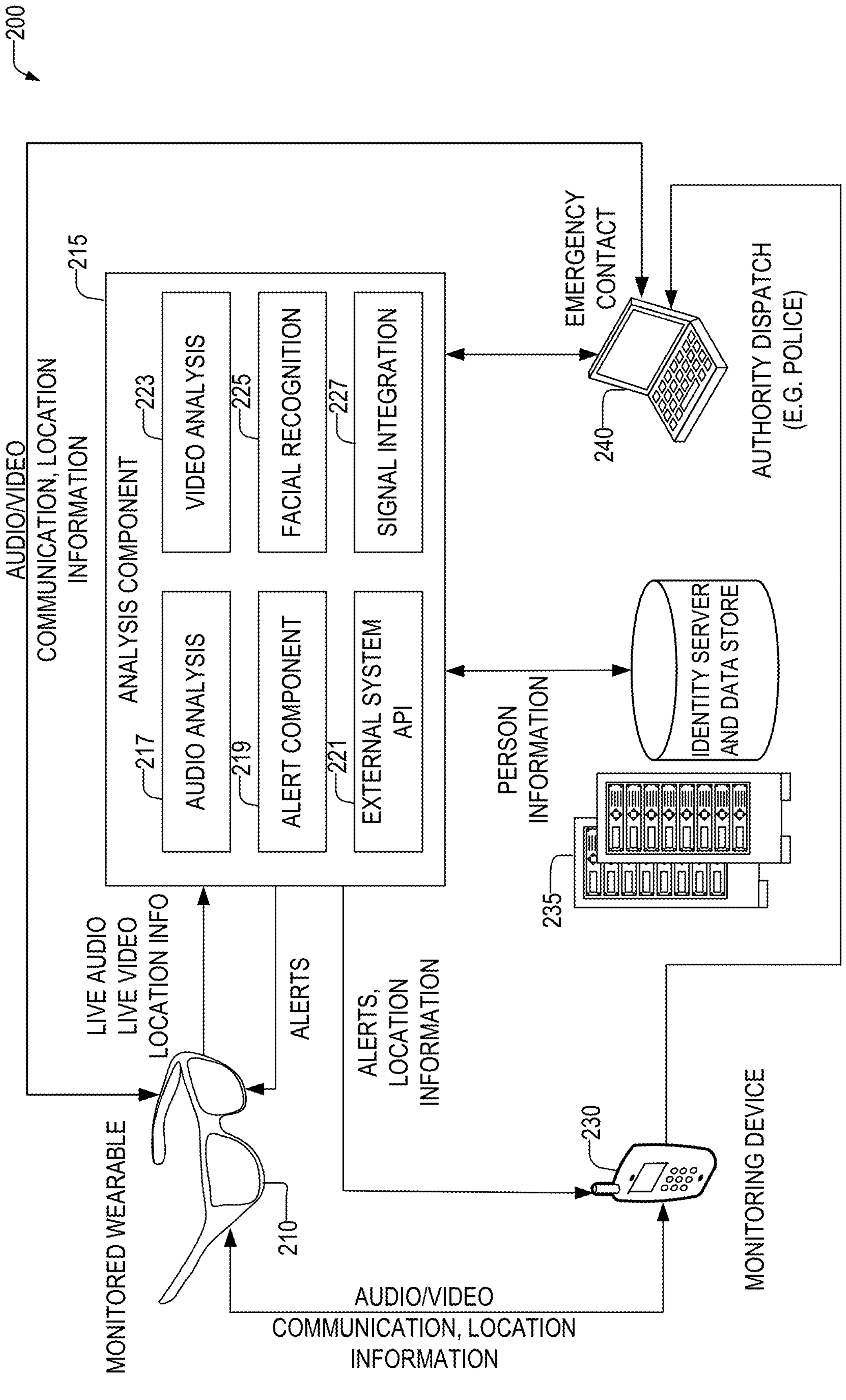

FIG. 2

AUGMENTED REALITY DEVICES FOR SAFETY ALERTING

PRIORITY APPLICATION

This application claims the benefit of priority to U.S. Provisional Application Ser. No. 63/521,803, filed Jun. 19, 2023, which is incorporated herein by reference in its entirety.

TECHNICAL FIELD

Embodiments pertain to augmented reality devices. Some embodiments relate to use of augmented reality to detect unsafe situations and warn users.

BACKGROUND

Augmented reality technologies use sensors and displays to present the illusion that computer generated content and mechanics are blended with real world items and actions. For example, smart glasses may superimpose computer generated content next to real world images of those elements viewed through smart glasses.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a schematic of a monitoring system according to some examples of the present disclosure.

DETAILED DESCRIPTION

Figure 1:
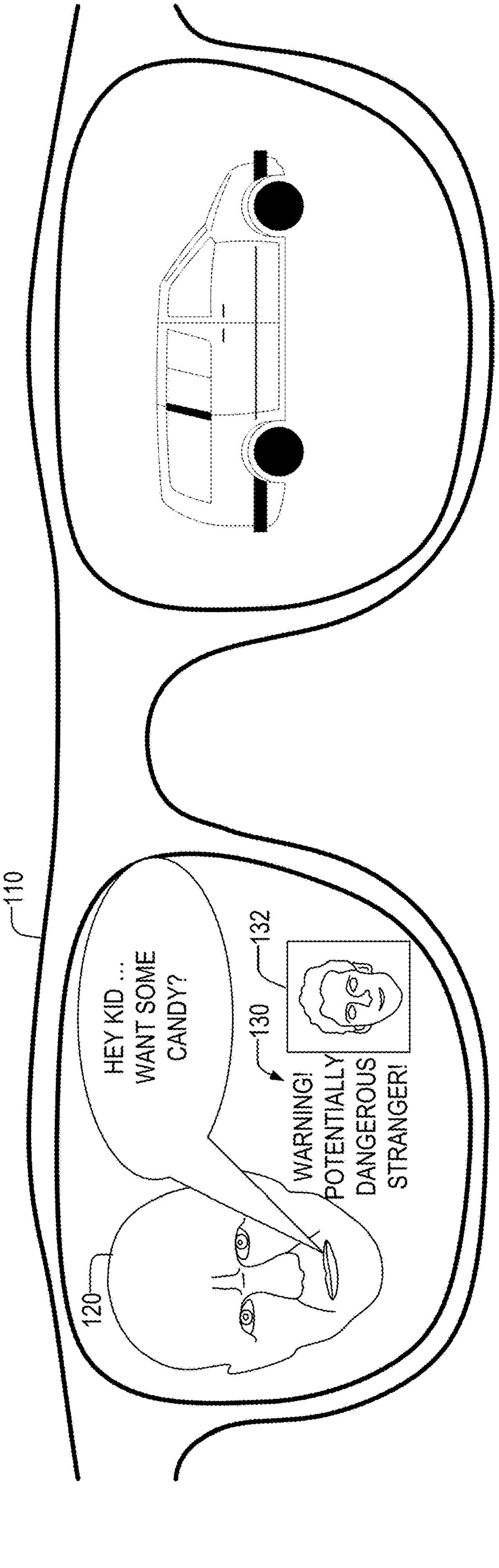
FIG. 1 illustrates an alert of a potentially dangerous stranger according to some examples of the present disclosure.

Certain individuals may lack the required awareness or aptitude to understand potentially dangerous persons or situations. For example, a small child may not understand that a stranger offering them candy could be a ruse to kidnap them. Similarly, individuals with disabilities may also have trouble recognizing situations that revolve around abuse or neglect.

Disclosed in some examples are methods, systems, and machine-readable mediums which utilize augmented reality devices to detect and warn vulnerable individuals about real-life situations that could pose a hazard to their safety. One or more signals identified from data captured by one or more sensors of one or more devices of the user may be analyzed to determine whether elements such as persons, objects, or the like pose a danger to the user. For example, audio and/or video of the real world captured by a device on a user may be processed by the system and analyzed to determine unsafe events, situations, or persons that may pose a hazard to the user. The system, upon detection of an unsafe event, situation, or person may then warn the user through the augmented reality glasses of the unsafe events, situations, or persons. In addition, a caregiver or other individual and/or the police may also be notified.

In some examples, upon detection of an unsafe event, situation, or person, the system may take one or more actions. For example, the system may display an alert to the user through the augmented reality glasses. The system may alert the user, a caregiver, or another party to give assistance. In other examples, the system may record audio and/or video of the situation. The recorded audio and/or video may be streamed over a network connection to a network-based service where it may be stored and may be made accessible to the user, caregiver, and/or other authority. In some examples, the recorded audio and/or video may be live streamed to a caregiver or an authority figure such as a police officer. In some examples, upon detection of an unsafe event, situation, or person, the system may stream geolocations of the user to a caregiver, authority, or a network-based service—where it may be stored and may be later made accessible to the user, caregiver, and/or other authority.

In still other examples, upon detecting an unsafe event, situation, or person, the system may connect the user to a caregiver via a communication session such as a phone call or video call. The video call may stream images from a camera facing the user and/or stream images from a camera showing the video of the situation so the caregiver can assess the situation. In some examples, the caregiver and/or police may be able to send verbal messages that are played through a loudspeaker or earpiece in the augmented reality device. For example, the caregiver may give verbal instructions to the user, or may even talk to persons in the vicinity of the events or situations or tell the unsafe person to move away.

In some examples, signals used in detecting an unsafe event, situation, or person may include one or more of audio, video, biometric and/or location information captured by one or more devices of the user (e.g., from the wearable smart glasses, a mobile phone, or the like) or information based upon audio, video, biometric, and/or location information captured by one or more devices of the user. The signals may be processed by a signals integration processing component using one or more rule sets and/or machine-learning models.

For example, the signals integration processing component may process audio captured by a device of the user by creating a live transcript and searching the live transcript for words and/or phrases that indicate an unsafe condition. For example, "hey kid, do you want some candy?" The signals integration processing component may utilize prespecified lists of words, phrases, or the like that indicate an unsafe situation or person. In some examples, the signals integration processing component may utilize chains of words and/or phrases. A chain of words and/or phrases may be a series of multiple words and/or phrases that are co-occurrent in the conversation as each of the words and/or phrases is detected within a specified time window. For example, the phrases "Hi kid," and "you look lost little girl" and "would you like a ride" may not necessarily trigger an alert on their own, but their presence together within a specified period of time (e.g., the conversation, a specified time window (e.g., 10 minutes), or the like) may trigger the alert. Upon detection of one of the prespecified lists of words, phrases, or chains of words and/or phrases alone, or in combination with other signals, the signals integration processing component may initiate an alert and may send the alert to an alert component. The alert component may determine the alert action to take.

In other examples, the signals integration processing component may process video captured by a device of the user using one or more video processing algorithms such as artificial intelligence algorithms. For example, various object detection and tracking algorithms may detect one or more dangerous conditions. For example, an unrecognized van may be identified that has just pulled up next to the user and the van door has opened. In some examples, a license plate may be identified, and a number may be read off the plate to determine whether the van is trusted or untrusted (e.g., based upon lists of trusted and/or untrusted numbers). In other examples, faces may be recognized and processed and an identity of the persons in the vicinity of the user may be determined. The determined identities may be cross checked against various lists. For example, there may be trusted persons, potentially dangerous persons, and unknown persons. In some examples, the user or guardian may set up a list of trusted persons. Trusted persons may also include databases of police officers, doctors, or the like. Potentially dangerous persons may include persons the user or guardian have specifically indicated as potentially dangerous (e.g., an estranged parent, estranged ex-partner, or the like). Potentially dangerous persons may also include persons in databases of sex offenders, convicted criminals, and the like.

In some examples, the signals integration processor may utilize object and/or identity of persons in the vicinity alone or in combination with other signals when determining whether to trigger an alert. For example, the presence of a dangerous person may trigger an alert. As another example, the presence of a dangerous person may trigger an alert if other signals indicate danger. For example, certain words and/or phrases that indicate unsafe situations may only be deemed unsafe if they come from individuals deemed unsafe or unknown. That is, an alert may not be generate if a trusted relative or family member asks a child if they want candy; however, if a stranger asks, then an alert may be generated.

In some examples, the signals integration processor may utilize video and/or audio to determine emotional sentiments of individuals in the environment of the user. For example, voice tone, facial expressions, and the like may be used to determine emotions. Certain emotions may, alone, or in combination with other signals may be used to generate alerts. For example, if the signals integration processor detects extreme anger directed at the user, the system may generate an alert.

In some examples, the signals integration processor may utilize biometric data of the user. For example, to determine whether the user is nervous, happy, sad, or shows signs of distress. The signals integration processor may utilize the biometric data alone, or in combination with other signals to generate an alert.

In some examples, the signals integration processor may utilize geolocation data of the user. The signals integration processor may utilize the geolocation data alone, or in combination with other signals to generate an alert. For example, an alert may be generated if the user is in a location, they are forbidden from entering. In other examples, some situations may normally generate alerts in some locations but not others. That is, an indication of an offer for candy at home may not generate an alert but may when away from home.

The signals integration component may utilize rulesets, artificial intelligence, and other information to determine, from one or more of the various signals, whether to generate an alert. In some examples, the rulesets may be customized by a user, caregiver, administrator, or other user. For example, a graphical user interface (GUI) may be presented that may allow users to determine, for particular signals or combinations of signals, whether alerts are issued and what actions are taken in response to those alerts. In other examples, a sensitivity setting, or slider may be provided that allows users to adjust the sensitivity of the signals integration component to various signals.

Once the signals integration component determines that an alert is to be generated, an alert component may determine, based upon one or more rules, which may utilize one or more of the aforementioned signals, whom to alert, and how to alert those users. For example, some alerts may only be displayed to the user in the augmented reality glasses. For example, upon detecting another person becoming angry at the user, the glasses may alert the user to defuse the situation. The alert may provide tips on defusing the situation. In some examples, other alerts may be used such as audible alerts, flashing alerts, and the like. As noted in some examples, other parties may be notified, such as police and/or a guardian. The type of alert and the party that is contacted may be based upon a perceived severity of the alert and the type of danger the user is facing. For example, an alert about an oncoming car that appears as if it is going to hit the user may be given to the user with high priority with audible sounds and flashing lights and/or messages. An alert indicating an abduction attempt may cause a visual alert to the user as well as contacting a guardian and/or police.

FIG. 1 illustrates an alert of a potentially dangerous stranger according to some examples of the present disclosure. Augmented reality glasses 110 may be worn by a user and may record audio, video, biometrics, geolocation, and/or other data of the user and the user's surroundings. In some examples, one or more aspects of the audio, video, biometrics, geolocation, and/or other data of the user and the user's surroundings may be recorded by other devices worn, or in possession of the user. In the example of FIG. 1, the system has determined that the situation may be a potentially dangerous stranger given the presence of an unknown person that is uttering a phrase that is associated or indicative of a possible attempt to kidnap the person. Responsive to determining that the situation is potentially dangerous, the system may alert the user to the potentially dangerous stranger 120 using a message 130. The message may be a text only message, or may be an audio message, a video message displayed on the augmented reality glasses, or the like. Audio and/or video messages 132 may be delivered by a person (e.g., a parent or guardian) that the person trusts and may have specific instructions for the person. The audio and/or video messages may be prerecorded messages that are selected based upon the type of dangerous situation, or in other examples may be live-streamed. For example, upon detecting the potentially dangerous situation or person the system may notify one or more prespecified user devices of one or more users such as caregivers or adults. Upon receiving the notification, an application on the caregiver or adult's user device may initiate a video call which may be displayed on the augmented reality glasses. The user of the augmented reality glasses 110 may see the caregiver's face and the caregiver, instead of, or in addition to seeing the person's face may also see the video and hear the audio collected by the augmented reality glasses to monitor and assess the situation and provide specific directions to the person. In the example of FIG. 1, a caregiver's video is displayed within the augmented reality glasses. In some examples, the warning and/or video of the caregiver may be semitransparent to avoid obscuring details of the environment.

FIG. 2 illustrates a schematic 200 of a monitoring system according to some examples of the present disclosure. A monitored wearable device 210 sends live audio, video, geolocation, biometric, and/or other information to an analysis component 215. As previously noted, in addition, or instead of the audio, video, biometric, geolocation, and/or other information being collected from the wearable, the audio, video, and/or location information may be collected by another device of the user of the wearable, such as a smartphone, smartwatch, smart ring, and/or the like. This information is processed by an analysis component 215. Analysis component 215 may be the wearable; a different device of the user, such as a smartphone, computer, or the like; or may be one or more servers of a network-based service. In some examples, some aspects of analysis component 215 may be performed by a device of the user (wearable, smartphone, or the like) and other aspects may be performed by one or more servers of a network-based service.

Analysis component 215 may detect potentially dangerous situations, persons, or events, and may provide one or more warnings on the monitored wearable device 210. The warnings may be specific to the dangerous persons, events, or situations that are detected. For example, a warning may say "run away and find an adult!" or "say no and walk away" depending on what was detected. In some examples, the warnings may include prerecorded audio and/or video—e.g., of a trusted caregiver or other person. Warnings may be selected based upon rules that map identified potentially dangerous situations, persons, or events (or categories of potentially dangerous situations, persons, or events) to warnings.

A monitoring device 230, which may be a computing device of a caregiver, may be notified when potentially dangerous situations, persons, or events are detected. The analysis component 215 may provide the information of the monitored wearable device 210 that triggered the warning. For example, an audio or video clip of just before, during, and/or after the event that generated the warning. In addition, the monitoring device 230 may be able to view and/or hear the live audio, video, and location information of the monitored wearable. In some examples, the monitoring device 230 may be automatically connected with the monitored wearable device 210 over a communication session (which may be connected without input from the user of monitored wearable device 210), which may allow the user of monitoring device 230 to see and hear what is going on, and in addition provide the user of monitored wearable device 210 directions on handling the situation as well as talk to any persons in the vicinity.

Analysis component may also contact one or more emergency authorities, such as authority dispatch service 240. Whether or not authorities such as police, paramedics, or fire departments are called may be based upon the type of potentially dangerous situations, persons, or events that are detected. For example, if a wanted felon is identified, the police may be notified.

Analysis component may include an audio analysis component 217. Audio analysis component may utilize artificial intelligence algorithms to convert the audio of one or more speakers into a textual transcript. In some examples, the AI algorithms may include Hidden Markov Models, Dynamic Time Warping (DTW), and deep learning algorithms such as deep time delay neural network (TDNN). The transcript may be text-searched to determine one or more words or phrases that indicate a potentially dangerous situation. The phrases may be predetermined and/or customizable and may be different depending on the user of the monitored wearable device 210. That is, the phrases that indicate a potentially dangerous situation may be different for a child than a vulnerable adult. In other examples, AI may be used to determine the potentially dangerous situations. For example, a Large Language Model (LLM) such as ChatGPT® may be asked to determine if a dangerous situation is unfolding based upon the transcript.

In some examples, the analysis component 215 may include a video analysis component 223. The video analysis component 223 may detect faces within the video. These faces may then be passed to the facial recognition component 225. Facial recognition component 225 may utilize an identity server and data store 235 to determine an identity of the recognized face. For example, by sending the recognized face to the identity server and data store 235. Identity server and data store 235 may have a database of faces matched with identities. The face sent to the identity server and data store 235 may be compared with the face database to determine if there is a match. If there is a match, the person's identity may be crosschecked against one or more lists of persons. These lists may include trusted persons, untrusted persons, dangerous persons, or unknown persons. In some examples, these lists may be specific to the user of the monitored wearable device 210. Trusted persons may be caregivers, family, friends, coworkers, and the like. Untrusted persons may include unknown persons but may also be individuals that are known to the person wearing the monitored wearable device 210, but who are not trusted, or are not necessarily dangerous. For example, certain coworkers, or acquaintances. Dangerous persons may be a list of persons that are not to be near the user of monitored wearable device 210—either due to past experiences or individuals on a list of criminals, sex offenders, or the like.

The identity server and data store 235 may provide an indication of the identities of the persons detected by the analysis component 215. The identities may be displayed to the user in their smart glasses proximate to where they were detected in the image on the monitored wearable device 210 to assist the wearer in remembering the names of individuals. In some examples, the identity server and data store 235 may be a part of the analysis component 215 or executed by a same device as analysis component 215.

Video analysis component 223 may also detect one or more objects or dangerous situations indicated by visual objects. In still other examples, the video analysis component 223 may determine emotions of individuals captured using their facial expressions.

Signal integration component 227 may use signals from the audio analysis component 217, video analysis component 223, facial recognition component 225, geolocation information, biometric information, and the like to determine whether to generate an alert. Rules or artificial intelligence models may be used to determine whether, given one or more signals, to generate an alert.

When an alert is to be generated, the alert component 219 may identify the type of alert, recipients of the alert, and whether other actions should be taken using artificial intelligence or rule-based approaches. One or more signals, the type of alert, a severity of the alert, and the like are used by the alert component 219 to determine how to handle the alert.

Alert component 219 may customize the alert based upon the user, a severity of the alert, alert type, a confidence of the system that the dangerous situation is occurring, and the like based upon one or more rules and/or artificial intelligence models. For example, a high severity, high confidence alert may alert the user of monitored wearable device 210, monitoring device 230 and the authority dispatch service 240; whereas medium severity alerts may only alert the monitoring device 230 and the user of monitored wearable device 210. Example alerts include text warnings to the user of monitored wearable device 210, video alerts, audio alerts, alert sirens, alert lights (e.g., LEDs on the monitored wearable device 210), and the like. Alerts may include live video and audio feeds being sent to the monitoring device 230 and/or authority dispatch service 240; alerts may also include live video and audio feeds being sent from the monitoring device 230 and/or authority dispatch service 240 and displayed or played to the user or bystanders of the monitored wearable device 210.

External system API 221 may implement one or more application programming interfaces to communicate with other computing devices such as monitored wearable 210, identity server and data store 235, and authority dispatch service 240.

Figure 3:
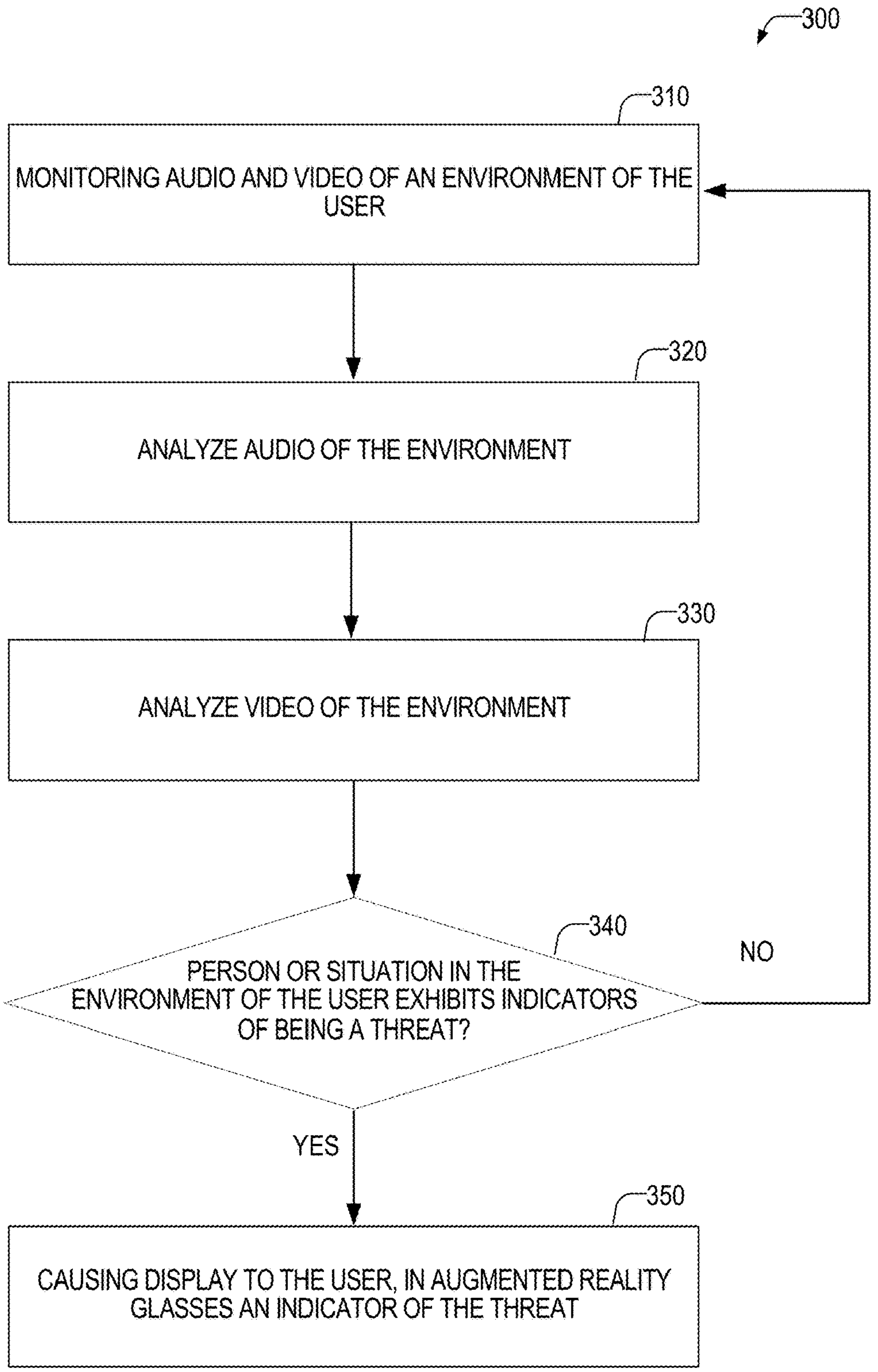
FIG. 3 illustrates a flowchart of a method for alerting a user to a dangerous situation according to some examples of the present disclosure.

FIG. 3 illustrates a flowchart of a method 300 for alerting a user to a dangerous situation according to some examples of the present disclosure. At operation 310 the system monitors, via a device of the user, audio and video of an environment of the user. For example, by analyzing audio and/or video data recorded by a wearable of the user (e.g., augmented reality glasses, smart watch, smart ring) or from a mobile device (e.g., smartphone) of the user. At operation 320, the system analyzes audio of the environment of the user to determine one or more spoken words or phrases. For example, by converting the audio to a transcript and analyzing whether any words and/or phrases indicates a threat. In other examples, a larger portion of a conversation may be analyzed in context—e.g., through a Large Language Model (LLM) or an NLP algorithm to determine whether the conversation has taken a threatening turn.

At operation 330, the system may analyze video of the environment of the user to identify a speaker of the one or more spoken words or phrases. For example, by detecting faces and then identifying the individuals in the video. Speaker detection may also be used, that may include detection of lip movements and/or voice print analysis to attribute words to identified faces.

In other examples, instead of, or in addition to facial and speaker detection, the video may be analyzed to detect objects, identify the objects, and determine whether they represent a danger to the user. For example, by using region based convolutional neural networks such as R-CNN, Fast R-CNN, Faster R-CNN, single shot multibox detector (SSD), or the like. These networks may also be trained using training images to identify dangerous situations. For example, a door of a van that is open. This information may, on its own, not be a dangerous situation, but when combined with a speaker who is unknown to the user, asking the user to get into the car, may trigger a dangerous situation warning. In addition the system may determine emotions of people in the surrounding vicinity of the user—e.g., using their facial expressions or other body cues.

At operation 340, the system may determine, based upon the analyzed audio and/or video such as based upon the one or more spoken words or phrases and the identity of the speaker, a person or situation in the environment of the user that is exhibiting indicators that poses a threat to the user. As noted above, this may be based upon if-then rules, artificial intelligence, or other algorithms. At operation 350, responsive to detecting the threat to the user, the system may cause display to the user, in augmented reality glasses, an indicator that a threat has been detected. If no threat is detected, operation goes back to 310 for additional monitoring.

Figure 4:
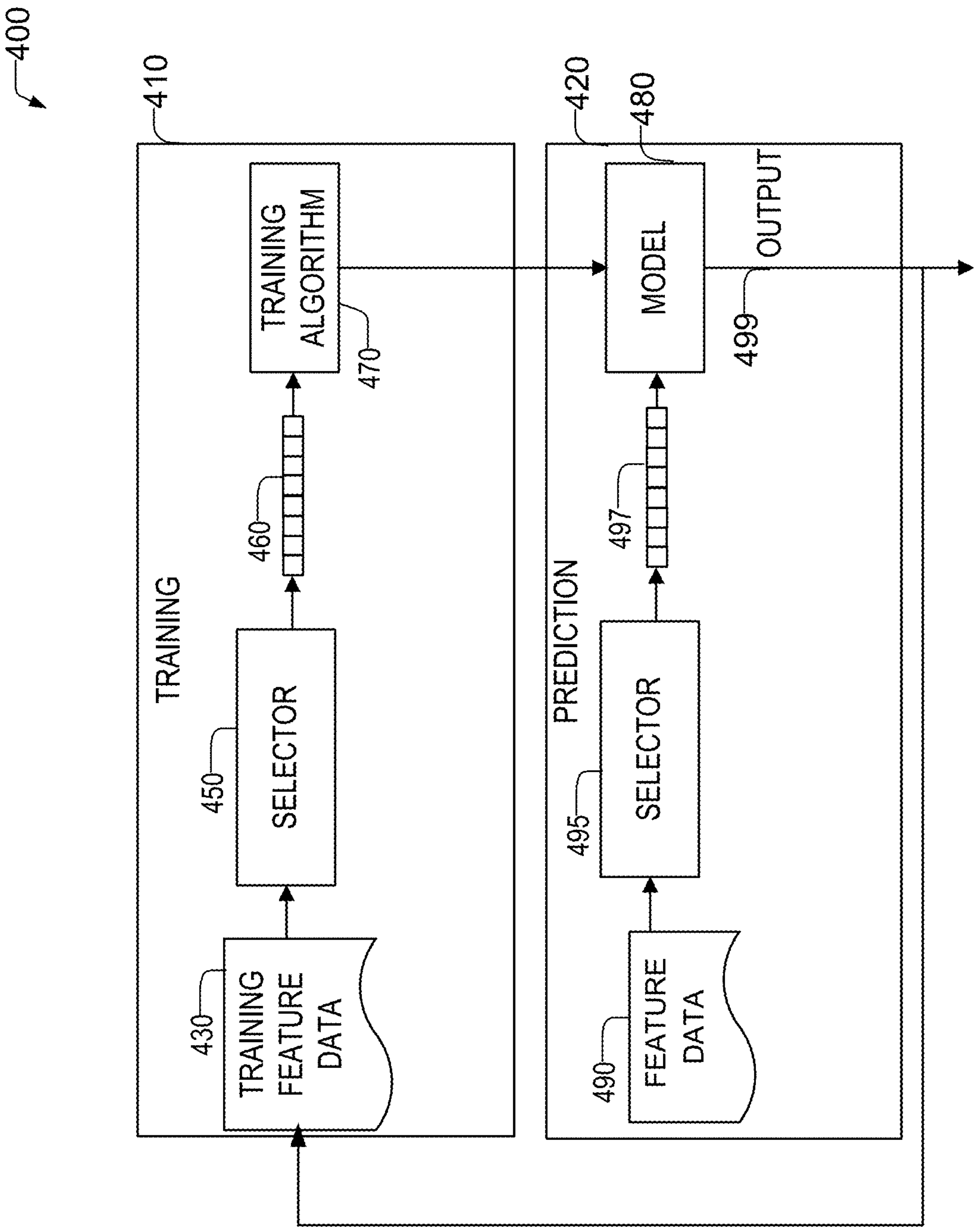
FIG. 4 shows an example machine learning component according to some examples of the present disclosure.

FIG. 4 shows an example machine learning component 400 according to some examples of the present disclosure. The machine learning component 400 may be implemented in whole or in part by one or more computing devices. In some examples, the training component 410 may be implemented by a different device than the prediction component 420. In these examples, the model 480 may be created on a first machine and then sent to a second machine. In some examples, one or more portions of the machine learning component 400 may be implemented by one or more components from FIG. 2.

In some examples, machine learning component 400 utilizes a training component 410 and a prediction component 420. Training component 410 inputs training feature data 430 into selector component 450. The training feature data 430 may include one or more sets of training data. The training feature data 430 may be labeled with the desired output. In other examples, the training data may not be labeled, and the model may be trained using unsupervised methods and/or feedback data—such as through a reinforcement learning method. The feedback data may be a measure of error between a desired result of the algorithm and the actual result.

Selector component 450 converts and/or selects training vector 460 from the training feature data 430. For example, the selector component 450 may filter, select, transform, process, or otherwise convert the training data. For example, the selector component 450 may apply one or more feature selection algorithms to find features in the training data. The selected data may fill training vector 460 and comprises a set of the training data that is determined to be predictive of a result. Information chosen for inclusion in the training vector 460 may be all the training feature data 430 or in some examples, may be a subset of all the training feature data 430. Selector component 450 may also convert or otherwise process the training feature data 430 such as normalization, encoding, and the like. The training vector 460 may be utilized (along with any applicable labels) by the machine learning algorithm 470 to produce a model 480. In some examples, other data structures other than vectors may be used. The machine learning algorithm 470 may learn one or more layers of a model. Example machine learning algorithms 470 may include gradient descent, gradient descent with backpropagation, and the like. Example layers may include convolutional layers, dropout layers, pooling/up sampling layers, SoftMax layers, and the like. Example models 480 may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction component 420, feature data 490 is input to the selector component 495. Selector component 495 may operate the same, or differently than selector component 450. In some examples, selector components 450 and 495 are the same components or different instances of the same component. Selector component 495 produces vector 497, which is input into the model 480 to produce an output 499. For example, the weightings and/or network structure learned by the training component 410 may be executed on the vector 497 by applying vector 497 to a first layer of the model 480 to produce inputs to a second layer of the model 480, and so on until the encoding is output. As previously noted, other data structures may be used other than a vector (e.g., a matrix).

The training component 410 may operate in an offline manner to train the model 480. The prediction component 420, however, may be designed to operate in an online manner. It should be noted that the model 480 may be periodically updated via additional training and/or user feedback. For example, additional training feature data 430 may be collected as users provide feedback on the performance of the predictions.

The machine learning component 400 may implement many different potential supervised or unsupervised machine learning algorithms. Examples include artificial neural networks, Generative Pretrained Transformer (GPT), convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, neural networks, a region based Convolutional Neural Network (R-CNN), a full CNN (for semantic segmentation), a mask R-CNN algorithm for instance segmentation, Latent Dirichlet Algorithm (LDA), hidden Markov models, dynamic time warping (DTW), deep feedforward neural network, recurrent neural network, Long short-term memory (LSTM), expectation-maximization algorithms, vector quantization, information bottleneck method, and the like.

As noted, the model may be used to convert live audio of the user's surroundings into a transcript using one or more speech recognition natural language processing (NLP) algorithms. Examples include hidden Markov models, neural networks, DTW, and the like. Training feature data 430 may include audio of individuals speaking and may be labelled with what was spoken. The training component 410 then attempts to train the model 480 by backpropagation to minimize an error between the training data that was input and the output.

Additionally, as noted, the model may be used to determine words or phrases or audio indicating a potentially unsafe situation. In these examples, the system may utilize a transcript as input to the model. Training transcripts may be used as training feature data 430 and transcripts of live audio may be used as feature data 490. The training feature data 430 transcripts may have one or more portions labeled that indicate a dangerous situation. In other examples, more general models such as a GPT model may be used that is trained on general data. The system may include a transcript and a prompt to the GPT model to indicate whether a dangerous situation is present for a particular individual.

The model may also be used to process video. For example, by detecting one or more objects and identifying if those objects constitute a dangerous situation. The training feature data 430 may be video scenarios labeled with dangerous situations. The feature data 490 may then be live video and the output 499 may be indications of whether a dangerous situation is indicated and, in some examples, the location of the dangerous situation (e.g., for display to the user in the smart glasses).

The model may be used to detect faces. For example, by a genetic algorithm or an eigen-face technique. In these examples, the training feature data 430 may be images of a scene that are labeled with a location of a face. In some examples, the feature data 490 may be an image captured by the user's wearable device and the output 499 may be a location of faces within the image. In some examples, the model may recognize faces, e.g., using the Viola-Jones algorithm which may use a Haar-like feature approach. In some examples, the model may be used to detect emotions.

In some examples, the machine-learning algorithms may utilize, as input, the output of other models and in some examples, the output of one or more models may be used as input to another model. For example, a first model may convert the audio to a transcript, which is input to a second model to determine if there are words spoken that indicates a dangerous situation. In still other examples, a first model processes the video to identify objects, a second model processes the audio to produce a transcript, and the transcript and description of the video may be used as input to a third model that identifies whether a dangerous situation exists considering the transcript and the video description. For example, an image of a van door being open may not be considered to be a dangerous situation in isolation but may be flagged when the transcript indicates that a stranger has asked if the user needs a ride.

In some examples the system, such as model 480, or rules, may be trained generally for detecting dangerous situations for broad classes of users of the wearable device. In some examples, users of the wearable devices may be segmented into one or more classes of users based upon the situations that may pose threats to them. For example, young children may face different threats than vulnerable adults. In these examples, each class of user may have a different rule set or model 480 that may be tuned to the particularized threats that the particular class experiences.

Figure 5:
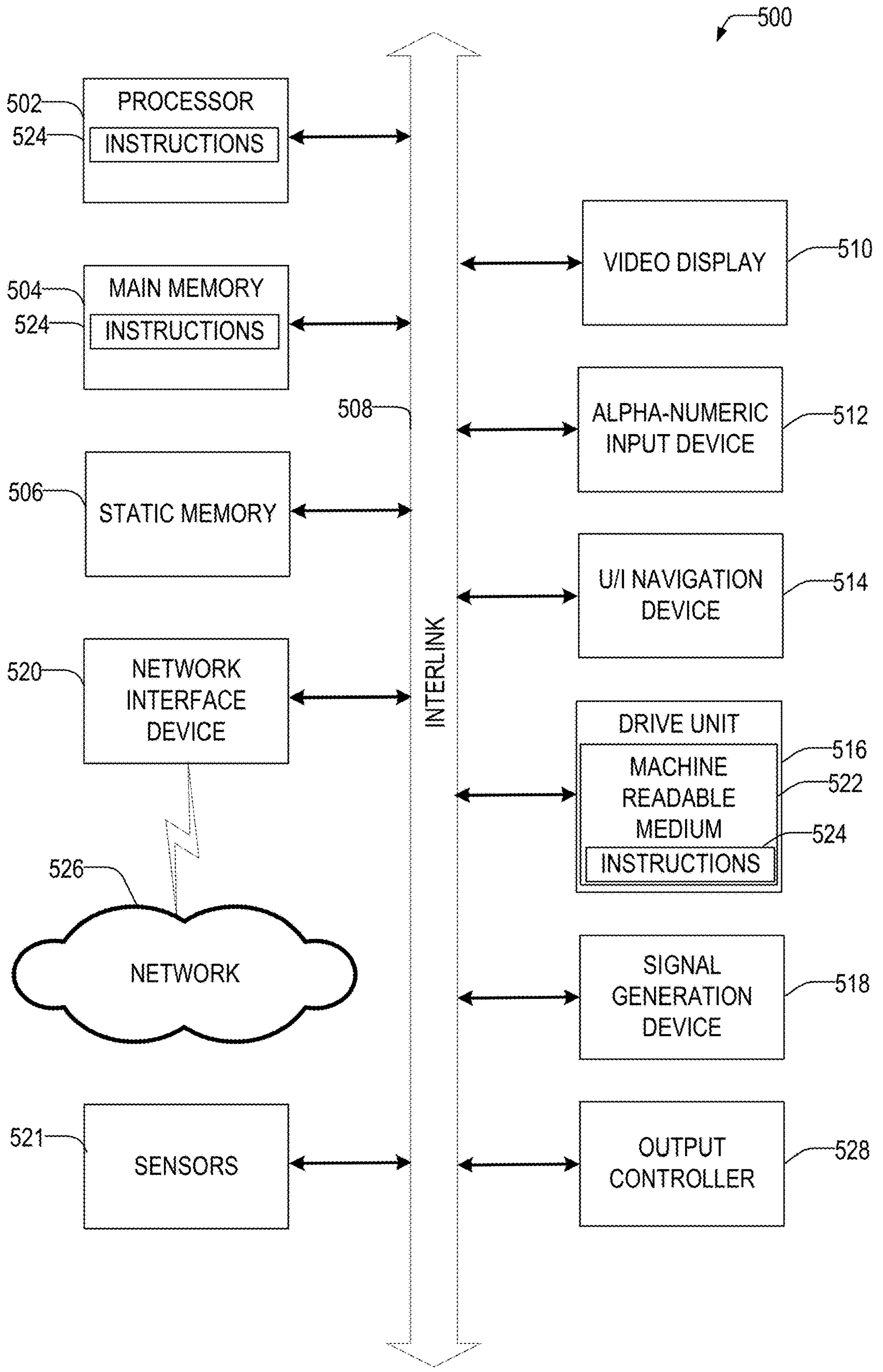
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be in the form of a wearable computing device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 500 may be or implement the smart glasses and display of FIG. 1, the monitored wearable device 210, monitoring device 230, analysis component 215, identity server and data store 235, authority dispatch service 240, the method of FIG. 3, the machine learning component 400, and the like.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 500 may include one or more hardware processors, such as processor 502. Processor 502 may be a central processing unit (CPU), a graphics processing unit (GPU), a hardware processor core, or any combination thereof. Machine 500 may include a main memory 504 and a static memory 506, some or all of which may communicate with each other via an interlink (e.g., bus) 508. Examples of main memory 504 may include Synchronous Dynamic Random-Access Memory (SDRAM), such as Double Data Rate memory, such as DDR4 or DDR5. Interlink 508 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or another sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Example 1 is a method for alerting a user to a dangerous situation, the method comprising: monitoring, via a sensor of a device of the user, audio and video of an environment of the user; analyzing audio of the environment of the user to determine one or more spoken words or phrases; analyzing video of the environment of the user to identify a speaker of the one or more spoken words or phrases; determining, based upon the one or more spoken words or phrases and the identity of the speaker, a person in the environment of the user that is exhibiting indicators that the person poses a threat to the user; and responsive to detecting the person in the environment of the user that is exhibiting indicators that the person poses the threat to the user, causing display to the user, in augmented reality glasses, an indicator that the person poses the threat to the user.

In Example 2, the subject matter of Example 1 includes, responsive to detecting, based upon the audio and video of the environment of the user, the person in the environment of the user that is exhibiting indicators that the person poses the threat to the user, causing delivery of a message to a second user.

In Example 3, the subject matter of Examples 1-2 includes, responsive to detecting, based upon the audio and video of the environment of the user, the person in the environment of the user that is exhibiting indicators that the person poses the threat to the user, contacting police.

In Example 4, the subject matter of Examples 1-3 includes, wherein detecting, based upon the audio and video of the environment of the user, the person in the environment of the user that is exhibiting indicators that the person poses the threat to the user comprises: transcribing audio spoken by the person to create a transcript; and identifying words or phrases in the transcript corresponding to a list of threatening words or phrases.

In Example 5, the subject matter of Examples 1-4 includes, wherein detecting, based upon the audio and video of the environment of the user, the person in the environment of the user that is exhibiting indicators that the person poses the threat to the user comprises: identifying a face of the person; determining an identity of the person from the face of the person; and determining that the identity of the person is on a list of persons that pose a threat.

In Example 6, the subject matter of Examples 1-5 includes, responsive to detecting, based upon the audio and video of the environment of the user, the person in the environment of the user that is exhibiting indicators that the person poses the threat to the user: causing the audio and video to be saved to a storage device in a network-based storage device.

In Example 7, the subject matter of Examples 1-6 includes, responsive to detecting, based upon the audio and video of the environment of the user, the person in the environment of the user that is exhibiting indicators that the person poses the threat to the user: causing geolocation data of the augmented reality glasses to be streamed to a network-based service.

In Example 8, the subject matter of Examples 1-7 includes, wherein the audio and video are captured by sensors on the augmented reality glasses.

Example 9 is a computing device for alerting a user to a dangerous situation, the computing device comprising: a processor; a memory, the memory storing instructions, which when executed by the processor, cause the computing device to perform operations comprising: monitoring, via a sensor of a device of the user, audio and video of an environment of the user; analyzing audio of the environment of the user to determine one or more spoken words or phrases; analyzing video of the environment of the user to identify a speaker of the one or more spoken words or phrases; determining, based upon the one or more spoken words or phrases and the identity of the speaker, a person in the environment of the user that is exhibiting indicators that the person poses a threat to the user; and responsive to detecting the person in the environment of the user that is exhibiting indicators that the person poses the threat to the user, causing display to the user, in augmented reality glasses, an indicator that the person poses the threat to the user.

In Example 10, the subject matter of Example 9 includes, wherein the operations further comprise, responsive to detecting, based upon the audio and video of the environment of the user, the person in the environment of the user that is exhibiting indicators that the person poses the threat to the user, causing delivery of a message to a second user.

In Example 11, the subject matter of Examples 9-10 includes, wherein the operations further comprise, responsive to detecting, based upon the audio and video of the environment of the user, the person in the environment of the user that is exhibiting indicators that the person poses the threat to the user, contacting police.

In Example 12, the subject matter of Examples 9-11 includes, wherein the operations of detecting, based upon the audio and video of the environment of the user, the person in the environment of the user that is exhibiting indicators that the person poses the threat to the user comprises: transcribing audio spoken by the person to create a transcript; and identifying words or phrases in the transcript corresponding to a list of threatening words or phrases.

In Example 13, the subject matter of Examples 9-12 includes, wherein the operations of detecting, based upon the audio and video of the environment of the user, the person in the environment of the user that is exhibiting indicators that the person poses the threat to the user comprises: identifying a face of the person; determining an identity of the person from the face of the person; and determining that the identity of the person is on a list of persons that pose a threat.

In Example 14, the subject matter of Examples 9-13 includes, wherein the operations further comprise, responsive to detecting, based upon the audio and video of the environment of the user, the person in the environment of the user that is exhibiting indicators that the person poses the threat to the user: causing the audio and video to be saved to a storage device in a network-based storage device.

In Example 15, the subject matter of Examples 9-14 includes, wherein the operations further comprise, responsive to detecting, based upon the audio and video of the environment of the user, the person in the environment of the user that is exhibiting indicators that the person poses the threat to the user: causing geolocation data of the augmented reality glasses to be streamed to a network-based service.

In Example 16, the subject matter of Examples 9-15 includes, wherein the audio and video are captured by sensors on the augmented reality glasses.

Example 17 is a non-transitory machine-readable medium, storing instructions, which when executed by a computing device, cause the computing device to perform operations comprising: monitoring, via a sensor of a device of the user, audio and video of an environment of the user; analyzing audio of the environment of the user to determine one or more spoken words or phrases; analyzing video of the environment of the user to identify a speaker of the one or more spoken words or phrases; determining, based upon the one or more spoken words or phrases and the identity of the speaker, a person in the environment of the user that is exhibiting indicators that the person poses a threat to the user; and responsive to detecting the person in the environment of the user that is exhibiting indicators that the person poses the threat to the user, causing display to the user, in augmented reality glasses, an indicator that the person poses the threat to the user.

In Example 18, the subject matter of Example 17 includes, wherein the operations further comprise, responsive to detecting, based upon the audio and video of the environment of the user, the person in the environment of the user that is exhibiting indicators that the person poses the threat to the user, causing delivery of a message to a second user.

In Example 19, the subject matter of Examples 17-18 includes, wherein the operations further comprise, responsive to detecting, based upon the audio and video of the environment of the user, the person in the environment of the user that is exhibiting indicators that the person poses the threat to the user, contacting police.

In Example 20, the subject matter of Examples 17-19 includes, wherein the operations of detecting, based upon the audio and video of the environment of the user, the person in the environment of the user that is exhibiting indicators that the person poses the threat to the user comprises: transcribing audio spoken by the person to create a transcript; and identifying words or phrases in the transcript corresponding to a list of threatening words or phrases.

In Example 21, the subject matter of Examples 17-20 includes, wherein the operations of detecting, based upon the audio and video of the environment of the user, the person in the environment of the user that is exhibiting indicators that the person poses the threat to the user comprises: identifying a face of the person; determining an identity of the person from the face of the person; and determining that the identity of the person is on a list of persons that pose a threat.

In Example 22, the subject matter of Examples 17-21 includes, wherein the operations further comprise, responsive to detecting, based upon the audio and video of the environment of the user, the person in the environment of the user that is exhibiting indicators that the person poses the threat to the user: causing the audio and video to be saved to a storage device in a network-based storage device.

In Example 23, the subject matter of Examples 17-22 includes, wherein the operations further comprise, responsive to detecting, based upon the audio and video of the environment of the user, the person in the environment of the user that is exhibiting indicators that the person poses the threat to the user: causing geolocation data of the augmented reality glasses to be streamed to a network-based service.

In Example 24, the subject matter of Examples 17-23 includes, wherein the audio and video are captured by sensors on the augmented reality glasses.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A method for alerting a user to a dangerous situation, the method comprising:

monitoring, via a sensor of a device of the user, audio and video of an environment of the user;

analyzing audio of the environment of the user to determine one or more spoken words or phrases of a person in the environment of the user;

analyzing video of the environment of the user to identify an identity of a speaker of the one or more spoken words or phrases;

determining, based upon both the one or more spoken words or phrases and the identity of the speaker, whether the person in the environment of the user is exhibiting indicators that the person poses a threat to the user; and responsive to detecting the person in the environment of the user is exhibiting indicators that the person poses the threat to the user, causing display to the user, in augmented reality glasses, an indicator that the person poses the threat to the user.

2. The method of claim 1, further comprising, responsive to detecting the person in the environment of the user is exhibiting indicators that the person poses the threat to the user, causing delivery of a message to a second user.

3. The method of claim 1, further comprising, responsive to detecting the person in the environment of the user is exhibiting indicators that the person poses the threat to the user, contacting police.

4. The method of claim 1, wherein analyzing audio of the environment of the user to determine one or more spoken words or phrases comprises:

transcribing audio spoken by the person to create a transcript; and wherein determining, based upon both the one or more spoken words or phrases and the identity of the speaker whether the person in the environment of the user is exhibiting indicators that the person poses a threat to the user comprises identifying words or phrases in the transcript corresponding to a list of threatening words or phrases.

5. The method of claim 1, wherein determining, based upon both the one or more spoken words or phrases and the identity of the speaker whether the person in the environment of the user is exhibiting indicators that the person poses a threat to the user comprises:

determining that the identity of the person is on a list of persons that pose a threat.

6. The method of claim 1, further comprising, responsive to detecting the person in the environment of the user is exhibiting indicators that the person poses the threat to the user, causing the audio and video to be saved to a storage device in a network-based storage device.

7. The method of claim 1, further comprising, responsive to detecting the person in the environment of the user is exhibiting indicators that the person poses the threat to the user: causing geolocation data of the augmented reality glasses to be streamed to a network-based service.

8. The method of claim 1, wherein the audio and video are captured by sensors on the augmented reality glasses.

9. A computing device for alerting a user to a dangerous situation, the computing device comprising:

a processor;

a memory, the memory storing instructions, which when executed by the processor, cause the computing device to perform operations comprising:

monitoring, via a sensor of a device of the user, audio and video of an environment of the user;

analyzing audio of the environment of the user to determine one or more spoken words or phrases of a person in the environment of the user;

analyzing video of the environment of the user to identify an identity of a speaker of the one or more spoken words or phrases;

determining, based upon both the one or more spoken words or phrases and the identity of the speaker, whether the person in the environment of the user is exhibiting indicators that the person poses a threat to the user; and responsive to detecting the person in the environment of the user is exhibiting indicators that the person poses the threat to the user, causing display to the user, in augmented reality glasses, an indicator that the person poses the threat to the user.

10. The computing device of claim 9, wherein the operations further comprise, responsive to detecting the person in the environment of the user is exhibiting indicators that the person poses the threat to the user, causing delivery of a message to a second user.

11. The computing device of claim 9, wherein the operations further comprise, responsive to detecting the person in the environment of the user is exhibiting indicators that the person poses the threat to the user, contacting police.

12. The computing device of claim 9, wherein the operations of analyzing audio of the environment of the user to determine one or more spoken words or phrases comprises transcribing audio spoken by the person to create a transcript; and wherein the operations of determining, based upon both the one or more spoken words or phrases and the identity of the speaker whether the person in the environment of the user is exhibiting indicators that the person poses a threat to the user comprises identifying words or phrases in the transcript corresponding to a list of threatening words or phrases.

13. The computing device of claim 9, wherein the operations of determining, based upon both the one or more spoken words or phrases and the identity of the speaker whether the person in the environment of the user is exhibiting indicators that the person poses a threat to the user comprises:

determining that the identity of the person is on a list of persons that pose a threat.

14. The computing device of claim 9, wherein the operations further comprise, responsive to detecting the person in the environment of the user is exhibiting indicators that the person poses the threat to the user, causing the audio and video to be saved to a storage device in a network-based storage device.

15. The computing device of claim 9, wherein the operations further comprise, responsive to detecting the person in the environment of the user is exhibiting indicators that the person poses the threat to the user:

causing geolocation data of the augmented reality glasses to be streamed to a network-based service.

16. The computing device of claim 9, wherein the audio and video are captured by sensors on the augmented reality glasses.

17. A non-transitory machine-readable medium, storing instructions, which when executed by a computing device, cause the computing device to perform operations comprising:

monitoring, via a sensor of a device of the user, audio and video of an environment of the user;

analyzing audio of the environment of the user to determine one or more spoken words or phrases of a person in the environment of the user;

analyzing video of the environment of the user to identify an identity of a speaker of the one or more spoken words or phrases;

determining, based upon both the one or more spoken words or phrases and the identity of the speaker, whether the person in the environment of the user is exhibiting indicators that the person poses a threat to the user; and responsive to detecting the person in the environment of the user is exhibiting indicators that the person poses the threat to the user, causing display to the user, in augmented reality glasses, an indicator that the person poses the threat to the user.

18. The non-transitory machine-readable medium of claim 17, wherein the operations further comprise, responsive to detecting the person in the environment of the user is exhibiting indicators that the person poses the threat to the user, causing delivery of a message to a second user.

19. The non-transitory machine-readable medium of claim 17, wherein the operations further comprise, responsive to detecting the person in the environment of the user is exhibiting indicators that the person poses the threat to the user, contacting police.

20. The non-transitory machine-readable medium of claim 17, wherein the operations of analyzing audio of the environment of the user to determine one or more spoken words or phrases comprises:

transcribing audio spoken by the person to create a transcript; and wherein the operations of determining, based upon both the one or more spoken words or phrases and the identity of the speaker whether the person in the environment of the user is exhibiting indicators that the person poses a threat to the user comprises identifying words or phrases in the transcript corresponding to a list of threatening words or phrases.

* * * * *